US009085058B2

(12) United States Patent
Clabunde et al.

(10) Patent No.: US 9,085,058 B2
(45) Date of Patent: Jul. 21, 2015

(54) PORTABLE TOOL

(75) Inventors: Joachim Clabunde, Heubach (DE);
Mark Heilig, Winnenden (DE)

(73) Assignee: C. & E. Fein GmbH (DE)

( * ) Notice: Subject to any disclaimer, the term of this patent is extended or adjusted under 35 U.S.C. 154(b) by 926 days.

(21) Appl. No.: 13/177,359

(22) Filed: Jul. 6, 2011

(65) Prior Publication Data

US 2012/0037391 A1 Feb. 16, 2012

(30) Foreign Application Priority Data

Jul. 6, 2010 (DE) .......................... 10 2010 027 205

(51) Int. Cl.

| | | |
|---|---|---|
| *B24B 23/04* | (2006.01) | |
| *B23Q 11/00* | (2006.01) | |
| *B27F 5/00* | (2006.01) | |
| *B25D 17/24* | (2006.01) | |
| *B24B 41/00* | (2006.01) | |

(52) U.S. Cl.
CPC ........ *B23Q 11/0032* (2013.01); *B23Q 11/0039* (2013.01); *B24B 23/04* (2013.01); *B24B 41/007* (2013.01); *B25D 17/24* (2013.01); *B27F 5/00* (2013.01)

(58) Field of Classification Search
CPC ........... B24B 7/00; B24B 9/00; B24B 23/00; B24B 23/03; B24B 23/04; B24B 49/00; B23Q 11/00; B27F 5/00; B25D 17/24
USPC ............. 173/49, 162.1, 162.2, 210, 211, 216, 173/217, 100; 451/344, 345, 350, 357, 358, 451/359, 270
See application file for complete search history.

(56) References Cited

U.S. PATENT DOCUMENTS

| | | | | |
|---|---|---|---|---|
| 2,392,097 A | * | 1/1946 | Meunier | 477/19 |
| 3,364,625 A | * | 1/1968 | Sogge | 451/270 |
| 4,322,921 A | * | 4/1982 | Maier | 451/357 |
| 4,537,177 A | * | 8/1985 | Steere et al. | 125/13.02 |
| 4,671,020 A | * | 6/1987 | Hutchins | 451/357 |
| 4,729,194 A | * | 3/1988 | Maier et al. | 451/357 |
| 5,425,666 A | * | 6/1995 | Frank et al. | 451/344 |
| 5,453,040 A | * | 9/1995 | Schaal et al. | 451/344 |
| 5,580,302 A | * | 12/1996 | Howard et al. | 451/357 |
| 5,888,128 A | | 3/1999 | Lamprecht et al. | |
| 5,919,085 A | * | 7/1999 | Izumisawa | 451/357 |
| 5,947,804 A | * | 9/1999 | Fukinuki et al. | 451/357 |
| 6,129,618 A | * | 10/2000 | Frech | 451/357 |

(Continued)

FOREIGN PATENT DOCUMENTS

| | | |
|---|---|---|
| DE | 19617478 A1 | 11/1997 |
| EP | 1736284 A1 | 12/2006 |
| WO | 2008128804 A1 | 10/2008 |

*Primary Examiner* — Scott A. Smith
(74) *Attorney, Agent, or Firm* — St. Onge Steward Johnston & Reens LLC

(57) ABSTRACT

The invention relates to a The portable tool, in particular a tool for grinding or cutting, having a housing with a gear head, having a drive shaft which can be rotationally driven by a motor and can be coupled via a coupling drive to a tool spindle for the drive thereof, wherein the tool spindle can be driven rotatingly oscillating about the longitudinal axis thereof and is configured for receiving a tool wherein a vibration absorber is provided at the tool spindle, the vibration absorber having an absorption mass which encloses the tool spindle. Preferably the absorption mass is configured substantially in a ring segment shape and encloses the tool spindle by at least 180°, or even by 360°.

21 Claims, 4 Drawing Sheets

(56) References Cited

U.S. PATENT DOCUMENTS

| | | | |
|---|---|---|---|
| 6,210,099 B1 * | 4/2001 | Hugbart et al. | 415/13 |
| 6,306,024 B1 * | 10/2001 | Kai et al. | 451/357 |
| 6,328,643 B1 | 12/2001 | Huber | |
| 6,394,884 B1 * | 5/2002 | Wuensch | 451/357 |
| 6,726,553 B2 * | 4/2004 | Tiede et al. | 451/357 |
| 6,926,595 B2 * | 8/2005 | Pollak et al. | 451/270 |
| 6,974,362 B2 | 12/2005 | Lindell et al. | |
| 7,104,873 B1 * | 9/2006 | Borinato et al. | 451/159 |
| 7,204,320 B2 * | 4/2007 | Berg | 173/2 |
| 7,363,713 B2 * | 4/2008 | Hirabayashi et al. | 30/392 |
| 7,721,861 B2 * | 5/2010 | Zhong | 192/48.92 |
| 8,302,477 B2 * | 11/2012 | Sarrazin et al. | 73/579 |
| 8,381,833 B2 * | 2/2013 | Bernardi | 173/162.1 |
| 2006/0289183 A1 | 12/2006 | Schreiber | |
| 2009/0311952 A1 | 12/2009 | Zaiser | |

\* cited by examiner

PORTABLE TOOL

CROSSREFERENCES TO RELATED APPLICATIONS

This application claims priority from German patent application 10 2010 027 205.1, filed on Jul. 6, 2010, the entire contents of which is incorporated herein by reference.

BACKGROUND OF THE INVENTION

The present invention relates to a portable tool, in particular a tool for grinding or cutting, having a housing with a gear head, having a drive shaft which can be rotationally driven by a motor and can be coupled via a coupling drive to a tool spindle for the drive thereof, wherein the tool spindle can be driven in a rotational oscillatory manner about the longitudinal axis thereof and is designed for accommodating a tool.

Such a portable tool is known from WO 2008/128804 A1.

Provided in the known portable tool is an eccentric coupling device which transmits a rotary movement of a drive shaft driven by a motor to an output shaft. A mass balance device is provided in this case for compensating for vibrations, said mass balance device performing a compensating movement opposed to the eccentric coupling movement of the eccentric coupling device.

This makes it possible in principle to reduce vibrations caused by the eccentric coupling device.

Portable tools having an oscillatory output movement regularly have eccentric arrangements, by means of which a rotational drive movement is to be converted, for instance, into a rotational oscillatory output movement. Even if the vibrations generated by these eccentric arrangements can be compensated for to a certain degree by opposed mass arrangements, it has been found that further factors causing vibrations or increasing vibrations can occur during the operation of the portable tools. Therefore considerable vibrations can therefore also continue to be felt by a user, and these vibrations can reduce the performance of the portable tool.

SUMMARY OF THE INVENTION

In view of this it is a first object of the invention is to disclose a portable tool comprising an oscillatory drive and having reduced vibrations.

It is a second object of the invention is to disclose a portable tool comprising an oscillatory drive, offering high performance and an ergonomic working.

It is a third object of the invention is to disclose a portable tool comprising an oscillatory drive and having a simple construction.

According to one aspect these and other object are achieved by a portable tool comprising:
  a housing;
  a gear head;
  a motor for rotatingly driving a drive shaft;
  a tool spindle for driving a tool;
  a coupling drive coupling said drive shaft with said tool spindle for rotatingly oscillatingly driving said tool spindle about a longitudinal axis thereof; and
    a vibration absorber coupled with said tool spindle for compensating for vibrations, said vibration absorber comprising an absorption mass at least partially surrounding said tool spindle.

The object of the invention is achieved in this way.

According to the invention, compensation for vibrations caused by fitted tools is made possible by the vibration absorber. To this end, the vibration absorber has an independent centrifugal mass, the absorption mass, which can oscillate in the opposite direction to the oscillating tool and can therefore help to reduce the vibration level in conventional applications in a sustained manner.

Application conditions which are common in practice can now also be taken into account during the vibration compensation. In particular, the fact that not only the revolving coupling drive for producing an oscillation movement but also other factors, in particular the tool used in each case, contribute to the generation of vibrations can be taken into account here.

A high moment of inertia can occur particularly in tools having large dimensions and associated high mass, and this moment of inertia can be substantially responsible within certain frequency ranges for the vibrations that can be felt by an operator.

According to one aspect of the invention, the absorption mass is designed substantially in a ring segment shape and encloses the tool spindle by at least 180°, preferably by at least 270°, more preferably by 360°.

In this way, the absorption mass can be formed around the tool spindle while saving construction space as far as possible. In this case, the absorption mass can be arranged, for instance, between two bearing points which are provided anyway on the tool spindle and which of course are at a certain axial distance from one another in order to be able to avoid high bearing loads caused by forces acting radially on the tool spindle outside the bearing spacing.

A ring-shaped mass piece can have a more favourable mass inertia/weight ratio compared with a disc-shaped mass piece. The vibration reduction can therefore be improved with an acceptable, low outlay in terms of mass.

If the absorption mass has a gap, and thus encloses the tool spindle by, for instance, at least 180° or at least 270°, construction space for other components or functionalities of the portable tool can be kept available in the region that is left free, and yet the ergonomics are improved by the vibration absorber. The construction space available can be used, for instance, for suction devices for discharging abrasive dust or chips or else for other force transmission members in the gear head of the portable tool. A compact design that is simple to manipulate can thus be obtained overall.

An absorption mass having a gap, said absorption mass being designed, for instance, in a circular ring segment shape or else in a horseshoe shape, can also be used, for example, when the portable tool is used with a non-rotationally symmetrical tool, which consequently can have a mass centre at a distance from the tool spindle.

According to a further aspect of the invention, the vibration absorber is designed for compensating for vibrations of the tool driven in an oscillatory manner, and the absorption mass has a mass centre which is arranged at that end of the tool spindle which faces the tool.

As a result of this arrangement, as small a distance as possible between the mass centre of the absorption mass and the mass centre of the tool can be achieved. Tilting moments or other influences which can have an adverse effect on the vibration behaviour of the portable tool can therefore be reduced.

In this case, it is preferred if the absorption mass or the inertia moment of the absorption mass is adapted to the tool to be used. For example, if the use of different tools having different dimensions or inertia moments is intended, it can he advantageous to adapt the absorption mass to that tool which, according to expectations, would result in the greatest vibration exposure of the portable tool.

According to a development of the invention, the mass centre of the absorption mass coincides substantially with the longitudinal axis of the tool spindle.

An especially effective vibration reduction can thereby be effected, in particular in rotationally symmetrical tools, the centre of gravity of which generally therefore likewise coincides with the longitudinal axis of the tool spindle.

Even in the case of an absorption mass which is not completely closed and which does not completely enclose the tool spindle, an arrangement of the mass centre on the longitudinal axis of the tool spindle can also be effected, for instance by deliberate material accumulation or omission of material.

In addition, it is preferred if the absorption mass has a main inertia axis which is arranged parallel to the longitudinal axis and preferably coincides with the latter.

Tilting moments with respect to the longitudinal axis can therefore be avoided during the compensating movement of the absorption mass. During rotational movements or pivoting movements about the main inertia axis, undesirable centrifugal moments can be reduced or entirely avoided. As a rule, the mass centre of the absorption mass likewise lies in this case on the main inertia axis.

According to a further configuration of the invention, the absorption mass has a mass centre which is arranged offset from the longitudinal axis of the tool spindle in the opposite direction to a mass centre, at a radial distance from the longitudinal axis, of the tool.

In this way, marked vibration damping can be effected, for instance, even in tools of non-rotationally symmetrical design. The tools in this case may be, for example, sawing tools in a circle segment shape. Furthermore, sawing tools can have the shape of an elongated flat piece, on the one end of which a tool receptacle is provided and on the other end of which a toothing section is located. Cranked tools are also conceivable. Those and other tools have a mass centre which does not lie exactly on the longitudinal axis of the tool spindle. If the mass centre of the absorption mass is now arranged opposite this mass centre of the tool on the opposite side of the longitudinal axis, the compensation vibration of the vibration absorber can dampen the excitation vibration in an especially effective manner.

This measure can be developed by the mass centre of the absorption mass and the mass centre of the tool being arranged substantially diametrically relative to one another with respect to the longitudinal axis.

In this case, the mass centre of the absorption mass and the mass centre of the tool lie opposite one another at the same level of the longitudinal axis exactly on opposite sides at the same distance. If the inertia moment of the absorption mass is at the same time matched exactly to the inertia moment of the tool, virtually complete "extinction" of the excitation vibrations that can be felt by the operator can be achieved in at least one frequency range.

Should the distances of the mass centres from the longitudinal axis not correspond, it is preferred to adapt the absorption mass, such that at least substantial conformity of the inertia moments with respect to the longitudinal axis can be effected overall.

According to a further aspect of the invention, the absorption mass is pivotably accommodated on the tool spindle or the housing via an absorption bearing.

This measure can result in excellent guidance and definition of possible pivoting displacements of the absorption mass, which in this case oscillates substantially as a torsional vibrator. Consequently, any spring systems or damper systems of the vibration absorber are freed of guidance tasks. The separation of functions avoids distortion of the characteristic of the vibration damper by movements in other degrees of freedom which occur, for instance, in a "free suspension" of the absorption mass.

It can therefore be ensured that the measures for reducing vibrations are also not adversely affected in unusual working positions. This applies, for instance, during overhead work, where displacement movements of the absorption mass can occur, which are caused, for example, by gravitation force and which cannot help to compensate for the excitation vibration.

An inner bearing arrangement on the tool spindle can be effected in a simple manner with little effort, since the absorption bearing in this case can be of small and compact configuration. On the other hand, an outer bearing arrangement on the housing requires in principle a larger absorption bearing. In this case, however, effective isolation of the vibration absorber from the tool spindle can be effected, and so there is no longer any direct contact. In this way, the compensating movement can be initiated without direct interactions between the tool spindle and the vibration absorber.

According to a further configuration of the invention, the vibration absorber has at least one spring element which is coupled to the housing and engages on the absorption mass.

This results in a vibratory spring-mass system in principle, which can be excited by the excitation frequency and can help in the process to compensate for the excitation vibration.

The spring element can be designed as a compression spring, tension spring, torsion spring or spiral spring, for example made from round material or flat material. Spring steels can be used in this case. The use of plastic or rubber springs is likewise conceivable.

By variation of the characteristic values of the spring element, for instance the spring constant, the inertia moment, the centre of gravity or the mass of the absorption mass, the vibration absorber can be influenced in such a way that the natural frequency thereof has a certain ratio to the vibration frequency to be eliminated or damped.

In an advantageous development of this configuration, a plurality of spring elements are provided which have directional stiffness overall, which substantially allows an oscillation movement of the absorption mass about the longitudinal axis.

In this case, for instance three spring elements, which are distributed along a periphery of the absorption mass, are preferably used.

As a result, the spring elements themselves can help to guide the absorption mass by virtue of the fact that, on the one hand, they are sufficiently flexible in order to allow pivoting of the absorption mass about the longitudinal axis and, on the other hand, they have a high degree of stiffness, which avoids displacements of the absorption mass in other directions.

With this arrangement, a vibration absorber can be realized in an especially simple manner at low material cost and with a low weight. At the same time, in particular a separate bearing arrangement of the absorption mass can be dispensed with.

According to a further aspect of the invention, the vibration absorber has at least one damping member.

It goes without saying here that inherent damping, for instance of the spring elements, can already help to avoid deflections of the oscillating absorption mass which are excessive in the resonant case. However, it can be advantageous to additionally provide damping members which have, for instance, friction linings for inhibiting the movement of the absorption mass or else can be designed as fluid dampers.

A damping member and a spring member can be readily combined in this case, for instance designed as a multi-layer leaf spring. Here, the spring layers can dampen both elasticity and relative movements, occurring during the deflection of the spring, of individual leaf spring layers in order to be able to arrange the damping even more effectively.

According to a development of the invention, it is preferred that at least one adjusting element is provided for adjusting the spring characteristic of the at least one spring element or the damping characteristic of the at least one damping member.

This measure has the advantage that the vibration absorber can be adapted to operating conditions prevailing in each case when using the portable tool.

It is thus conceivable, for instance during fluctuations in the operating frequency of the portable tool, which can be caused, for example, through the use of especially light or else especially large and heavy tools, to influence to spring stiffness in order to adapt the natural frequency of the vibration absorber.

Likewise, depending on the form, inertia moment and dead weight of the tools to be used, the damping effect of the spring-mass system can be increased or reduced.

According to a development of this configuration, the at least one adjusting element is designed for mechanical adjustment or electromechanical adjustment and has in particular a piezo element.

Therefore, for instance in the case of mechanical adjusting elements, an operator can specifically influence the stiffness or the damping characteristic of the vibration absorber, before or after starting the portable tool, by actuating adjusting wheels or adjusting screws. An optimum vibration behaviour for the respective tool can thus be obtained during operation.

When at least one piezo element is used, the adjustment can be effected in an automated manner and continuously during the operation at a high pulse frequency in a manner directly derived from instantaneous operating states of the portable tool. Piezo elements can perform changes in length or thickness at high speed when a voltage is applied.

In a preferred development of the invention, a sensor, in particular a vibration sensor, for detecting an operating frequency of the portable tool is provided, said sensor being coupled via a control device to the at least one adjusting element for the activation thereof.

In this way, both the detection of the operating state and the adjusting operation can be effected continuously in an automated manner during the operation of the portable tool without the operator having to intervene separately for this purpose. A vibration sensor is suitable in this case in particular for state detection, since it can be used both for determining the operating frequency and for detecting vibration amplitudes.

The sensor is advantageously designed for indirectly or directly detecting the vibrations actually acting on the operator. In this case, it is preferred if the acceleration sensor is arranged on the portable tool at a handle region, on which the user acts when using the portable tool.

Conventional application frequencies for portable tools having tools driven in a rotational oscillatory manner are, for instance, within ranges of between 6000 and 13000 rev/min, preferably within the range of between 10000 and 12000 rev/min, more preferably around 11000 rev/min. However, even if the operating frequency of the portable tool is predetermined as a rule by a nominal speed of the drive motor, speed changes can be expected, depending on the inertia moment of the tool to be driven and on cutting or grinding forces which occur, for example, when engaging in a workpiece.

It is especially advantageous to also determine these deviations, even though they are slight, and if need be match the natural frequency of the vibration absorber thereto. Otherwise, in the event of deviations between the excitation frequency, normally the operating frequency of the portable tool, and the natural frequency of the vibration absorber, a combination or superimposition giving rise to new frequencies could occur, instead of mutual extinction, and this combination or superimposition can result in vibration loads that can be felt by the operator. Continuous monitoring of the operating frequency and adaptation, derived therefrom, of the natural frequency of the vibration absorber can therefore make possible a noticeable reduction in the vibration level over a wide speed range.

According to a further aspect of the invention, it is preferred if the vibration absorber has a vibrating frequency which is matched to the operating frequency of the portable tool.

It goes without saying here that the vibrating frequency of the vibration absorber can also be, for instance, a multiple of the natural frequency of the vibration absorber.

In a preferred configuration of the invention, the absorption mass is designed in a ring segment shape, in particular in a horseshoe shape, and has a centrally arranged absorption arm which extends radially inwards in the direction of the tool spindle and which is accommodated on the tool spindle via an absorption bearing, wherein substantially symmetrical ring segment sections extend from the absorption arm and have, at the ends thereof, cheeks which result in a mass accumulation.

The configuration of the absorption mass enables in this case a central arrangement of the mass centre of the absorption mass, even if the absorption mass does not completely enclose the tool spindle. Therefore sufficient construction space can be kept for adjacent components and other functionalities, for instance dust extraction.

According to a further configuration of the invention, the absorption bearing is arranged between a drive-side bearing and an output-side bearing of the tool spindle, and the absorption mass has a mass centre which is axially displaced from the absorption bearing in the direction of the tool-side end of the tool spindle.

This special configuration takes into account the fact that, on the one hand, components for realizing other functions, for instance dust extraction, should be arranged directly behind the tool and, on the other hand, as small an axial offset as possible between the mass centres of the tool and the absorption mass is desired for optimum vibration reduction.

In this case, when considering the mass centre of the tool, it is perfectly possible, in addition to the tool, to also take into account other components oscillating together with the tool. This concerns in particular the configuration of the tool spindle in the region of the absorption mass and of a tool receptacle and elements for fastening the tool to the tool spindle. In this respect, this may give rise to an aggregate mass centre which is distinctly closer to the mass centre of the absorption mass than the mass centre of the tool considered in isolation.

In an expedient development of the invention, a central spring receptacle which is coupled to a leaf spring arrangement is arranged on the absorption mass, wherein the leaf spring arrangement has two substantially symmetrical spring elements and each spring element has an inner end and an outer end, the respective inner end engaging on the common central spring receptacle via a coupling surface and the respective outer end engaging via an accommodating surface on a corresponding spring receptacle accommodated on the housing side, and the spring elements each have a curve which is arched radially outwards and faces away from the tool spindle.

In this way, the spring elements can also be arranged in a region in which the absorption mass extends, such that regions left free by the absorption mass do not have to be occupied by the leaf spring arrangement.

Leaf springs are suitable in principle for use in a spring-mass system and can in addition be provided and fitted with fastening geometries in an especially simple manner. The fastening geometries are in this case preferably integrated into the spring elements or are jointly embodied in one piece with said spring elements.

According to a further aspect of the invention, a suction device is mounted between the absorption mass and the tool-side end of the tool spindle, said suction device having a discharge passage which is in a plane in which the absorption mass is arranged and extends in a region in which the tool spindle is not enclosed by the absorption mass.

In this way, in particular in a portable tool which is designed for the rotational oscillatory drive of a grinding tool, a significant reduction in the vibration load can be achieved and at the same time highly effective extraction of grinding dust can be made possible.

In a portable tool which in addition has, on the drive shaft and the tool spindle, a mass balance for compensating for the vibrations caused by the coupling drive for converting the rotational drive movement into a rotational oscillatory output movement, an even greater reduction in the vibration level along with a clearly noticeable improvement in the ergonomics for the user are therefore obtained overall.

It goes without saying that the abovementioned features and the features of the invention still to be explained below can be used not only in the respectively specified combination but rather also in other combinations or on their own without departing from the scope of the present invention.

BRIEF DESCRIPTION OF THE DRAWINGS

Further features and advantages of the invention follow from the description below of further preferred exemplary embodiments with reference to the drawings, in which.

DETAILED DESCRIPTION OF THE PREFERRED EMBODIMENTS

Figure 1:
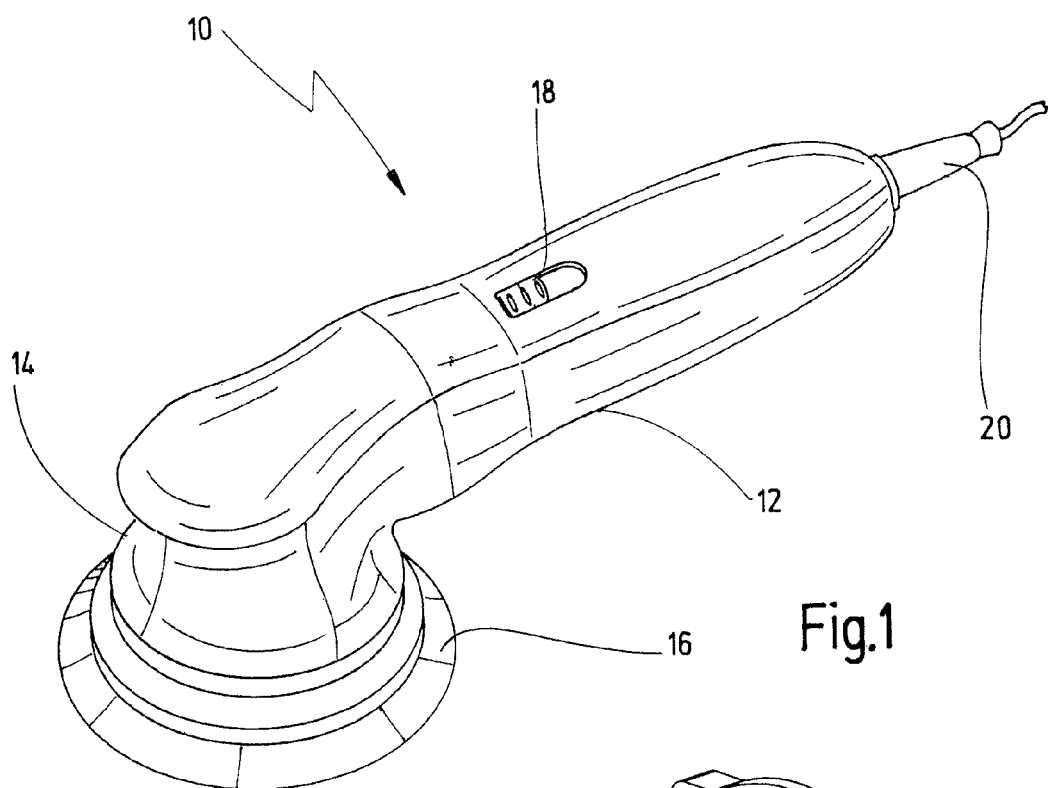
FIG. 1 shows a perspective view of a portable tool according to the invention.

A portable tool according to the invention is shown in FIG. 1 and is designated overall by 10.

The portable tool 10 has a housing 12 and, in the front region thereof, a gear head 14, to which a tool 16, in this case a grinding tool, is fastened.

Portable tools having an oscillating drive can likewise be operated with cutting tools, smoothing tools or cut-off tools. Grinding tools can be designed, firstly, for flat grinding, like the tool 16, and likewise, depending on the form of the tool, also for grinding slots or the like and generally also for grinding freeform surfaces. Depending on the intended application, grinding tools can in this case be of disc-shaped or triangular design and, if required, can be provided with abrasives at the circumference.

An application related to grinding is the polishing of surfaces using suitable polishing tools.

For cutting applications or sawing applications, the portable tool 10 can be provided with corresponding tools which have geometrically defined cutting contours or sawing contours. The tools in this case can be rotationally symmetrical tools, for instance circular saw blades, or else tools in the form of circle segments or those with straight toothing sections.

Portable tools having tools operated in a rotational oscillatory manner normally have pivoting frequencies within the range of about 5000 to 25000 rev/min and typical pivoting angles between about 0.5° and 7°. They are therefore suitable for many different applications and permit precise and reliable work with high performance.

The housing 12 of the portable tool 10 extends in the longitudinal direction starting from the gear head 14 and merges into a handle region. A switch 18 is provided for starting the portable tool 10. A supply line for providing electrical energy is indicated by 20. It goes without saying in this case that the portable tool 10 can also be readily provided with an integrated energy supply device, for instance a battery, or else can be driven by means of compressed air.

Figure 2:
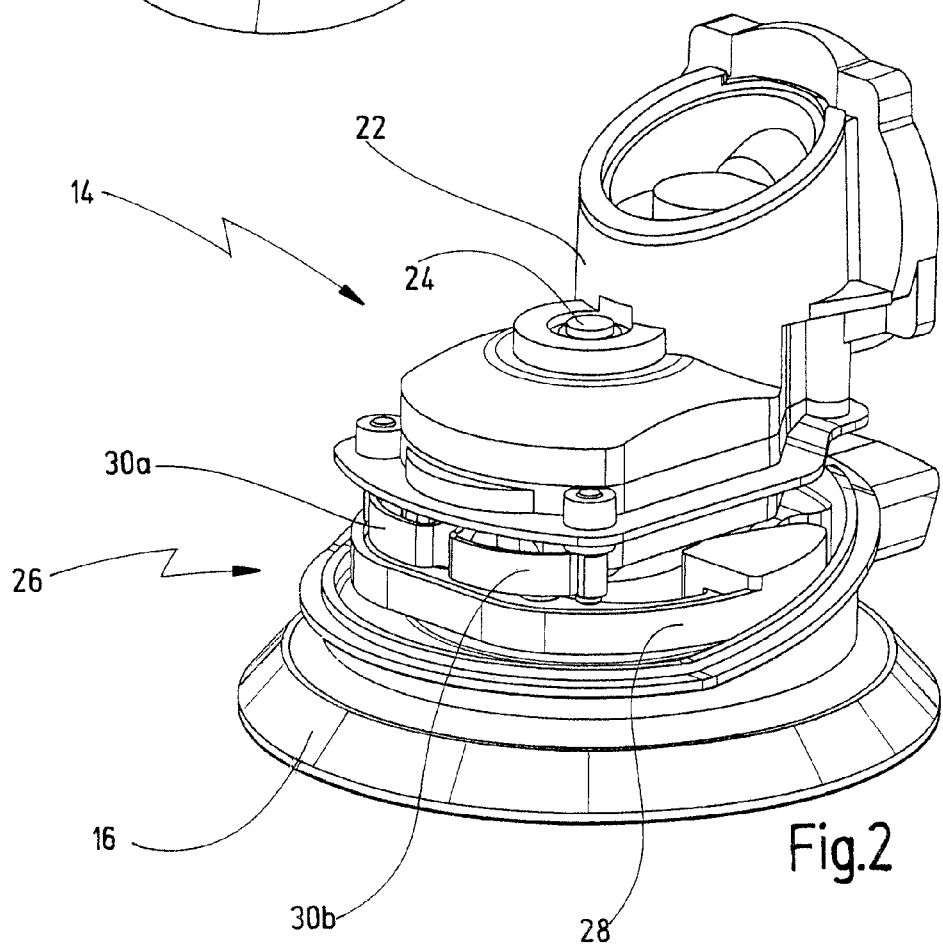
FIG. 2 shows a perspective view of a gear head of the portable tool according to FIG. 1, with a vibration absorber.

FIG. 2 shows a perspective illustration of the gear head 14, parts of the housing 12 which lie on the outside not being shown in the illustration. The gear head 14 has a gear housing 22 which belongs to the housing 12 or else can be coupled to the latter.

A vibration absorber 26 is provided for reducing vibrations, said vibration absorber 26 being arranged in the region of a tool spindle 24 (cf. also FIG. 3) and having an absorption mass 28 which encloses the tool spindle 24. The vibration absorber 26 and in particular the absorption mass 28 are in this case arranged as close to the tool 16 as possible.

The construction of the vibration absorber 26 will be explained with reference to FIGS. 2 to 5. The absorption mass 28 of the vibration absorber 26 is designed to be vibratory and is intended primarily to counter vibrations during the operation of the portable tool 10, which vibrations are caused by the movement of the tool 16. In this case, the vibration absorber 26 has spring elements 30a, 30b, cf. also FIG. 5. The spring elements 30a, 30b are secured to the gear housing 22 or indirectly or directly to the housing 12 of the portable tool 10 and form together with the absorption mass 28 a vibratory spring-mass system.

The absorption mass 28 is provided with an absorption arm 32 which accommodates an absorption bearing 34, via which the vibration absorber 26 is mounted on the tool spindle 24.

Figure 4:
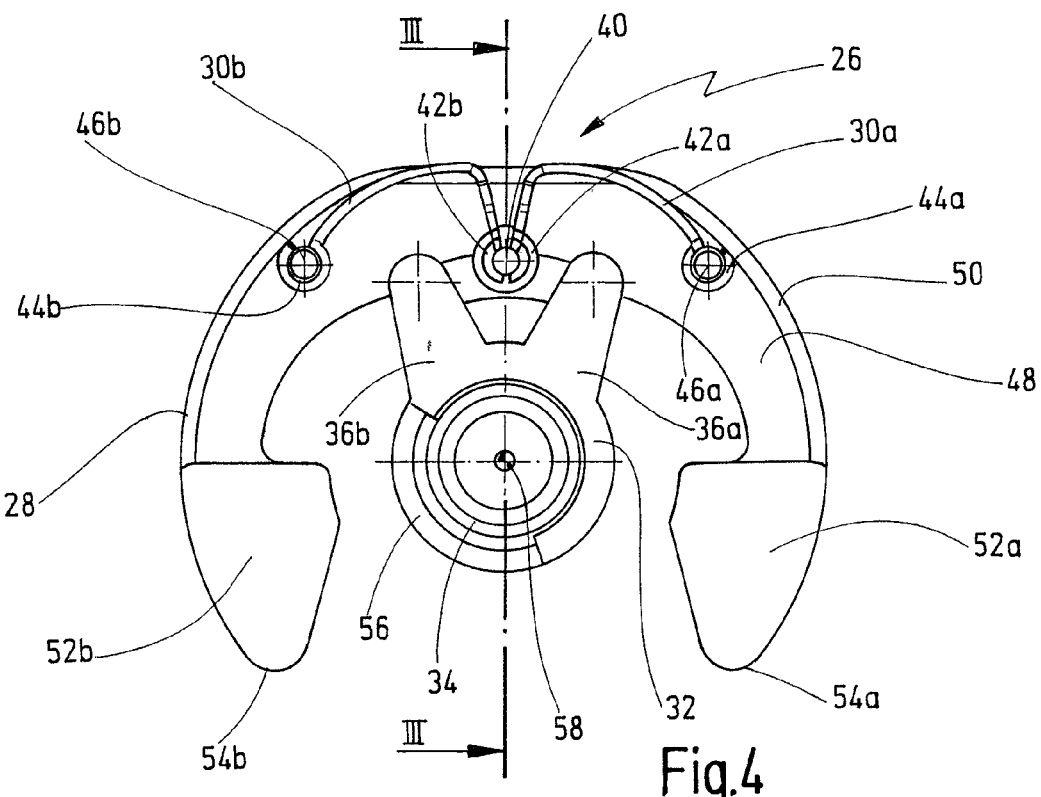
FIG. 4 shows a plan view of the vibration absorber according to FIG. 2 and FIG. 3.
Figure 5:
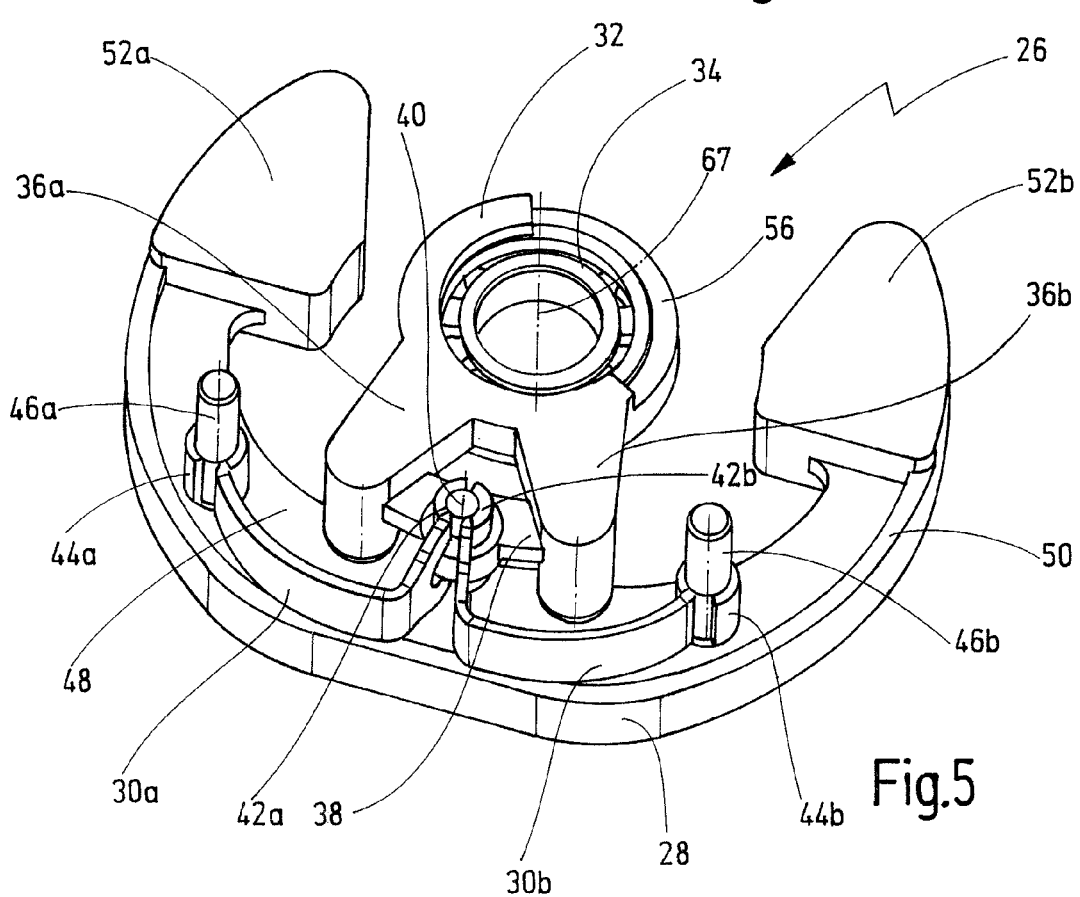
FIG. 5 shows a perspective view of the vibration absorber according to FIG. 4.

FIGS. 4 and 5 illustrate an especially preferred configuration of the vibration absorber 26 which is especially suitable for use in a portable tool 10 having a grinding tool. The absorption mass 28 of the vibration absorber 26 is in this case designed substantially in a ring segment shape or horseshoe shape. Furthermore, the absorption mass 28 has a central absorption arm 32 which is coupled to the absorption mass 28 via two webs 36a, 36b. The absorption arm 32 encloses the absorption bearing 34. Furthermore, the webs 36a, 36b of the absorption arm 32 are connected via a transverse web 38, on which a spring receptacle 40 in the form of an accommodating pin is arranged. The spring elements 30a, 30b engage on the spring receptacle 40.

Here, the spring elements 30a, 30b are designed in the form of leaf springs. On their end facing the spring receptacle 40, the spring elements 30*a*, 30*b* have coupling surfaces 42*a*, 42*b*, via which the engagement on the spring receptacle 40 is ensured. The coupling surfaces 42*a*, 42*b* are in this case designed in a fork shape and each have two legs which interact with the spring receptacle 40, which projects on both sides beyond the transverse web 38.

The spring elements 30*a*, 30*b* are supported on the housing side via bearing pins 46*a*, 46*b*, on which accommodating surfaces 44*a*, 44*b* in the form of eyes are arranged, said accommodating surfaces 44*a*, 44*b* being provided at the other respective end of the spring elements 30*a*, 30*b*.

Between the spring receptacle 40 and the bearing pins 46*a*, 46*b*, the spring elements 30*a*, 30*b* are each provided in a curved shape with an arch which is directed outwards and faces away from the absorption arm 32. The spring elements 30*a*, 30*b* can have slight preloading in a neutral position, for instance according to FIG. 4, in which the absorption mass 28 is not pivoted relative to the gear housing 22 or the housing 12 of the portable tool 10, that is to say relative to the bearing pins 46*a*, 46*b* accommodated on the housing side. Rattling and an excessively sensitive response behaviour of the vibration absorber 26 can thus be avoided.

Even if the absorption mass 28 does not completely enclose the tool spindle 24, it is advantageous, especially in the case of rotationally symmetrical tools, to configure the absorption mass 28 in such a way that a mass centre 58 of the absorption mass 28 is obtained which is arranged as far as possible in the region of the tool spindle 24, preferably on a longitudinal axis 60 of the tool spindle 24. Such a configuration can be readily obtained in the case of a closed rotationally symmetrical absorption mass.

However, the configuration of the absorption mass 28 shown in FIG. 4 also enables a central arrangement of the mass centre 58 in the case of an open absorption mass which does not completely enclose the tool spindle 24. The absorption mass 28 has a flat profile section 48, which can extend over approximately 180°. Towards the outside, the profile section 48 has a stiffening edge region 50. Adjoining both ends of the profile section 48 are cheeks 52*a*, 52*b* which merge into rounded-off end regions 54*a*, 54*b*. Compared with the profile section 48, the cheeks 52*a*, 52*b* are of relatively bulky construction and help to arrange the mass centre 58 as centrally as possible.

In principle, the vibration absorber 26 can be designed symmetrically. Indicated in this case in FIG. 4 is a plane of symmetry which corresponds to the section plane of the illustration in FIG. 3.

For reasons relating to construction space, a recess 56 is provided on the absorption arm 32 of the absorption mass 28, said recess 56 ensuring the ease of motion of the absorption arm 32 relative to the other components accommodated on the tool spindle 24. It goes without saying in this case that the small recess in the central region of the absorption mass causes no significant displacement of the mass centre from the longitudinal axis 60.

Figure 3:
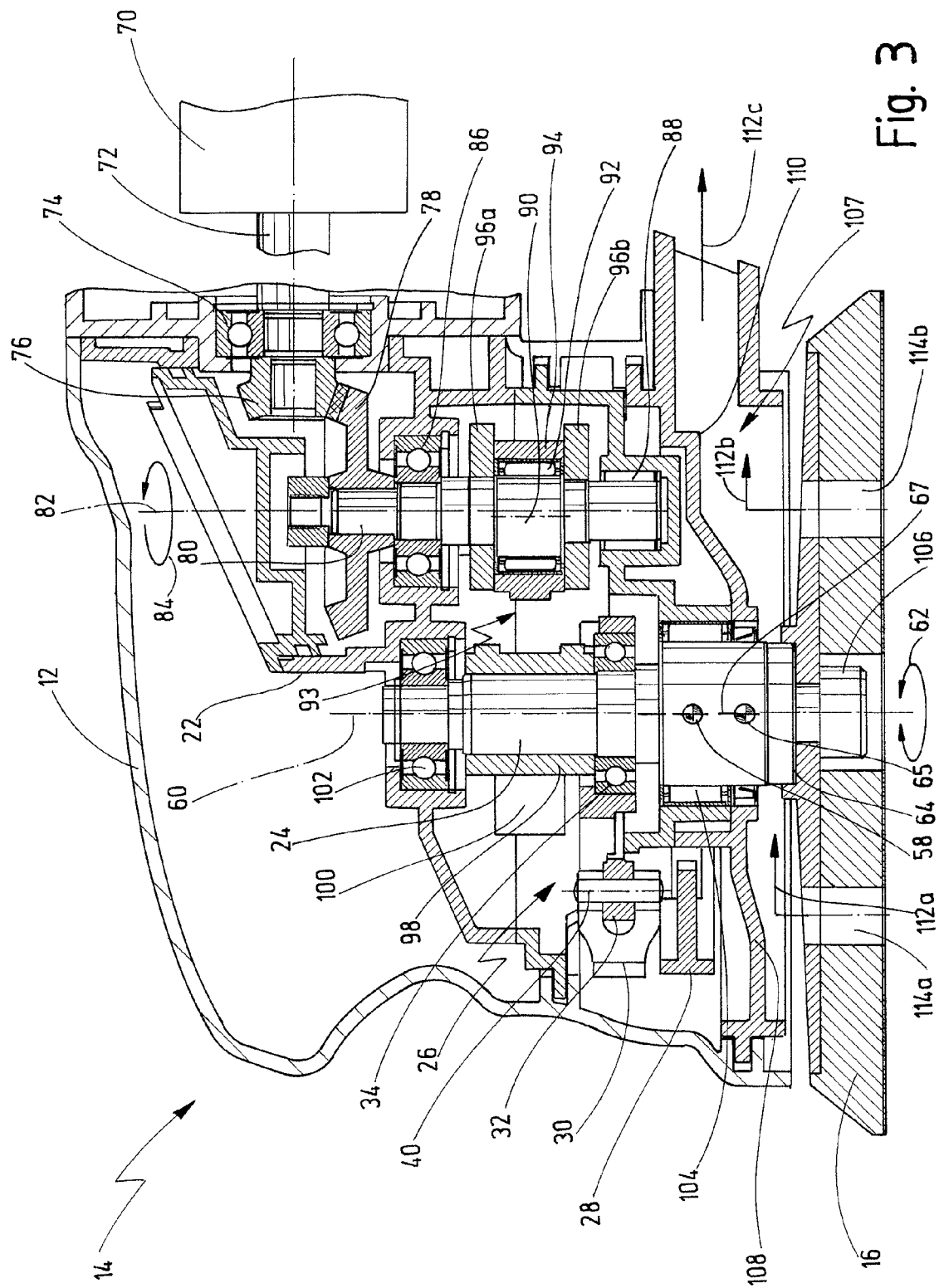
FIG. 3 shows a sectioned side view of the portable tool according to FIG. 1 in the region of the gear head.

FIG. 3 shows a vibration absorber 26 in the fitted state. In relation thereto, the interaction of the vibration absorber with other components of the gear head 14 will now be explained.

As mentioned above, the aim is to arrange the mass centre 58 of the vibration absorber 26, as viewed axially, as close to a mass centre 65 of the tool 16 as possible. In the present case, the tool 16 is of rotationally symmetrical design in the form of a grinding disc, such that the mass centre 65 of the tool 16 is located on the longitudinal axis 60 of the tool spindle 24. Accordingly, it is attempted in terms of design to also place the mass centre 58 of the vibration absorber 26 as to close as possible to or directly on the longitudinal axis 60.

A main inertia axis of the absorption mass 28 is indicated by 67 in FIGS. 3 and 5. Said main inertia axis coincides in FIG. 3 with the longitudinal axis 60 of the tool spindle 24. If the absorption mass 28 now performs the compensating movement about the tool spindle 24, to be more precise about the main inertia axis 67 and the longitudinal axis 60, centrifugal forces which are associated with the form of the absorption mass 28 and which in turn can cause vibrations can be avoided by this configuration.

As mentioned above, tools which are not designed symmetrically or rotationally symmetrically with respect to the longitudinal axis 60 can also be used in portable tools having a rotational oscillatory output. In this case, the tools may be, for instance, segmented sawing tools which, starting from the tool spindle 24, extend substantially only radially in one direction. Consequently, in such tools, the mass centre 65 is at a distance from the longitudinal axis 60. If such tools are to be primarily used in the portable tool 10, the design of the vibration absorber 26 and in particular of the absorption mass 28 can be directed towards arranging the mass centre 58 at a distance from the longitudinal axis 60 in the same way as the mass centre 65, in which case the mass centre 58 and the mass centre 65 are to be arranged on opposite sides of the longitudinal axis 60.

For example, in FIG. 3, if a configuration arises in which a tool is used in which the mass centre 65 is shifted to the left from the longitudinal axis 60, it is advisable to displace the mass centre 58, depending on the actual mass of the absorption mass 28, approximately by the same amount to the right from the longitudinal axis 60. Effective vibration compensation can thus also be effected in such applications.

A motor 70 which rotationally drives a motor shaft 72 is provided for driving the portable tool 10, cf. FIG. 3. The motor shaft 72 is accommodated in the housing 12 of the portable tool via at least one motor bearing 74. A pinion 76 is provided at the end of the motor shaft 72. The pinion 76 meshes with a gear 78 which is accommodated on a drive shaft 80. The pinion 76 and the gear 78 are designed as a bevel gear stage and transmit the drive movement of the motor shaft 72 to the drive shaft 80, which is tilted by about 90° relative to said motor shaft 72. Furthermore, the drive shaft 80 performs a rotational movement about its drive axis 82. The drive movement is indicated by an arrow designated by 84.

The drive shaft 80 is accommodated in the gear housing 22 via a first bearing 86 and a second bearing 88. An eccentric section 90, which belongs to a coupling drive 93, lies between the first bearing 86 and the second bearing 88. The coupling drive 93 substantially converts the rotational drive movement, cf. arrow 84, into a rotational oscillatory output movement of the tool spindle 24, as indicated by an arrow designated by 62.

Furthermore, the coupling drive 93 has an eccentric bearing 92, via which a coupling member 94 (only partly shown in FIG. 3) revolves on the eccentric section 90. The eccentric section 90 is arranged between two eccentric cheeks 96*a*, 96*b*, which can also be designed for compensating for the mass displacement, caused by the eccentric section 90, on the drive shaft 80. In particular the vibrations accompanying the generation of the oscillation movement can be reduced by this compensating mass.

The coupling member 94 is coupled to a rocker 98 (only partly shown in FIG. 3) connected to the tool spindle for rotation therewith. The coupling drive 93 therefore has the form of a crank-rocker mechanism with drive on the crank, the eccentric section 90, and output on the rocker 98. It goes without saying that other mechanisms for converting the rotational drive movement into the rotational oscillatory output movement can be used. A mass balance in the form of a counterweight is indicated by 100 on the rocker 98. The mass balance 100 counteracts the mass displacement due to the configuration of the rocker 98. The vibration level accompanying the generation of the oscillating output movement can thus also be reduced.

The tool spindle 24 is accommodated in the gear housing 22 between a drive-side bearing 102 and an output-side bearing 104. Both the rocker 98 belonging to the coupling drive 93 and the vibration absorber 26 are arranged between the drive-side bearing 102 and the output-side bearing 104. On its tool-side end, the tool spindle 24 has a tool receptacle 64, to which the tool 16 is secured by means of a tool fastener 106. The tool receptacle 64 can be designed for holding the tool 16 in a frictional and/or positive-locking manner.

A suction device 107 is provided between the output-side bearing 104 and the tool 16. The suction device 107 has a suction base 108, which adjoins the tool 16 at the rear. Connected to the suction base 108 is a suction passage 110, via which the particles to be drawn off, for instance abrasive dust and tool abrasion, can be discharged. To this end, there are suction openings 114a, 114b in the tool 16. When a vacuum is applied to the suction passage 110, for instance by attaching a separate extractor, the particles are discharged as indicated with the aid of arrows designated by 112a, 112b, 112c.

Especially in tools for grinding, boundary conditions can arise under which conformity between the axial position of the mass centre 58 of the vibration absorber 26 and the mass centre 65 of the tool 16 can be completely achieved. Nonetheless, the configuration according to FIG. 3 shows that it is possible to displace the mass centre 58 of the absorption mass 28 axially at least to a considerable extent in the direction of the mass centre 65 of the tool 16.

In principle, the mass centre 65 can also take into account the configuration of other components of the portable tool 10 which jointly oscillate with the tool 16. This may concern in particular a section of the tool spindle 24 in the region of the tool receptacle 64 and the tool fastener 106. Together with the tool 16, said components participate to a considerable degree in the vibration loading accompanying the generation of the oscillation movement. It is therefore appropriate to also consider said components when designing the vibration absorber 26.

In particular the open configuration of the absorption mass 28 which can be seen from FIGS. 4 and 5 permits a good compromise between functional requirements which are reflected in construction space conditions and as effective a vibration compensation as possible. Both the second bearing 88 of the drive shaft 80 and the suction passage 110 of the suction device 107 are arranged in the region that is left free and is not occupied by the absorption mass 28. In the case of an absorption mass which would completely enclose the tool spindle 24, a markedly greater axial construction space would be required for integrating these subassemblies. Furthermore, however, this would also be reflected in a larger axial distance between the mass centre 58 of the absorption mass 28 and the mass centre 65 of the tool 16.

Nonetheless, it is conceivable to design the absorption mass 28 as a closed ring in a portable tool which is mainly used for cutting or sawing and has no suction device. In particular when the drive movement is transmitted from a drive motor without an intermediate shaft directly to a coupling drive, an advantageous, compact configuration can be obtained, which, at a low cost, can compensate to a high degree the vibration exposure caused by the oscillating tool and can markedly improve the working comfort for the user.

Figure 6:
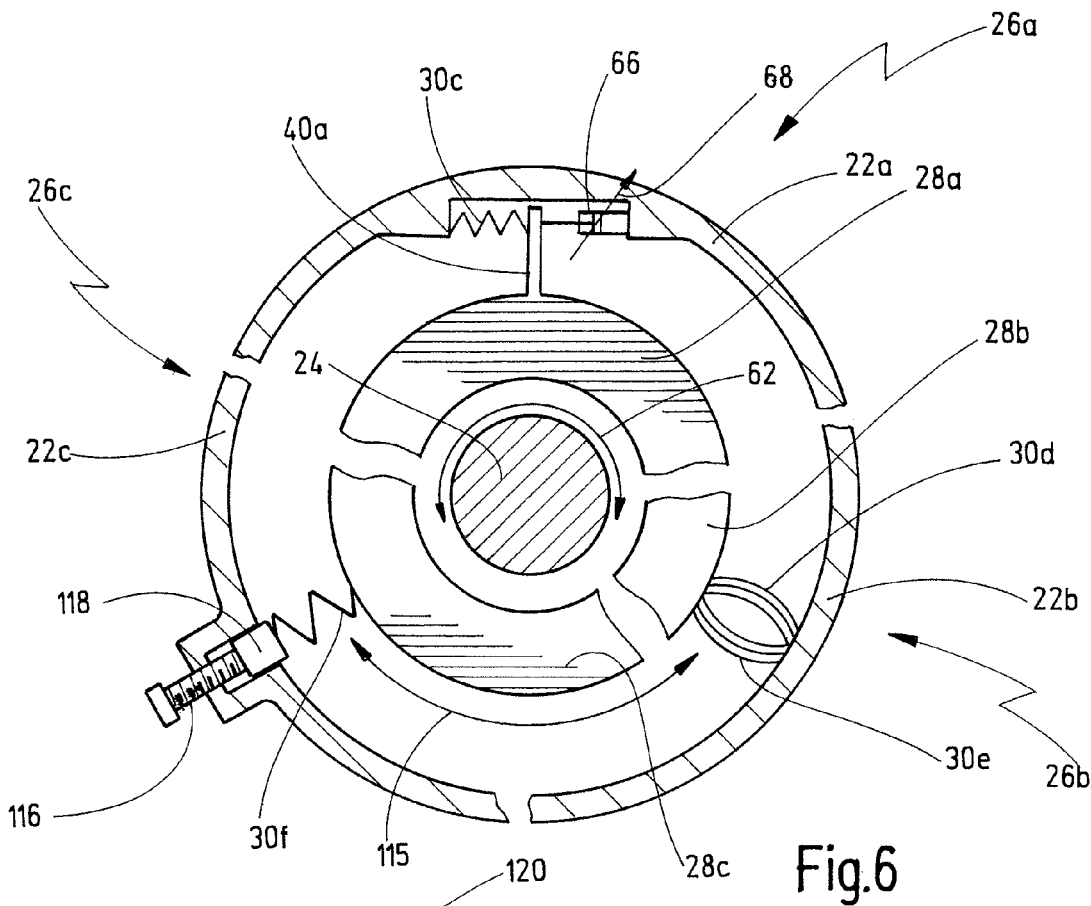
FIG. 6 shows a simplified plan view of a plurality of vibration absorbers modified compared with FIG. 4.

FIG. 6 shows configurations of a vibration absorber which are especially suitable in this respect but are nonetheless also conceivable for an alternative use in the portable tool 10 according to FIG. 3.

A total of three variants of a coupling of the absorption mass 28 to the gear housing 22 are shown in a schematically simplified manner in FIG. 6. In contrast to the configuration of the vibration absorber 26 according to FIGS. 4 and 5, a separate bearing arrangement of the absorption mass 28a, 28b, 28c has been dispensed with in this case. The absorption mass 28a, 28b, 28c is guided via spring elements 30c, 30d, 30e, 30f, which now also ensure the axial support of the absorption mass 28a, 28b, 28c. As a result, an absorption bearing, which would entail additional outlay in terms of mass and would require additional construction space, can be avoided.

In this case, it is advantageous if the spring elements 30c, 30d, 30e, 30f have a high degree of stiffness in the direction of the tool spindle 24, such that the resulting spring-mass system of the vibration absorber 26 is designed substantially only to vibrate about the longitudinal axis 24, as indicated by an arrow designated by 115. This vibration is effected in response to the excitation vibration, indicated by the arrow designated by 62, of the tool accommodated on the tool spindle 24.

For as definite a mounting of the absorption mass 28a, 28b, 28c as possible, it is advisable to provide three respective accommodating points with spring elements 30c, 30d, 30e, 30f on the gear housing 22a, 22b, 22c. Other configurations, for instance with two or four accommodating points, are readily conceivable. It is likewise conceivable to design the absorption mass 28a, 28b, 28c in a ring segment shape, for example in order to be able to take into account restrictions in the gear head 14 of the portable tool 10 which are due to construction space.

FIG. 6 shows, in a first configuration, a vibration absorber 26a in which an absorption mass 28a is coupled to a spring element 30c via a spring receptacle 40a. In addition to the spring element 30c, a damping member 66 acts on the spring receptacle 40a. In this case, for instance, the damping member 66 can be adjustable, that is to say it can have an adjusting element, as indicated by an arrow designated by 68. For instance three spring damper members can be arranged in such a way at the periphery of the absorption mass 28a. Damping can further improve the functionality of the vibration absorber 26a and can in particular effectively limit the amplitude of the deflection of the vibration absorber 26a within the resonant range. It should be noted in this case that there is in principle certain damping due to internal friction in the components involved, in particular in the spring elements 30. Nonetheless, separate damping members or friction members can help to reduce vibration energy in order to reduce the vibration exposure.

Furthermore, an alternative vibration absorber 26b is indicated by 26b in FIG. 6, in which vibration absorber 26b spring elements 30d, 30e, which are designed as leaf spring stacks, are accommodated at the periphery on the absorption mass 28b and support the latter relative to the gear housing 22b. Leaf spring stacks can offer a high degree of inherent damping, and therefore, if need be, separate damping members 66, as taken into account in the alternative vibration absorber 26a, can be dispensed with. The damping effect of the spring elements 30d, 30e is primarily obtained due to the relative movement of leaf springs lying one above the other during deflections of the spring elements 30d, 30e, which results in a high degree of friction.

Finally, FIG. 6 alternatively shows a vibration damper which is designated by 26c and in which an adjusting element 116 for influencing the spring characteristic of a spring element 30f is provided. The adjusting element 116 acts on the spring element 30f via a coupling piece 118. In particular the stiffness of the spring element 30f can be influenced by adjusting the adjusting element 116. In this way, the inherent behaviour of the vibration absorber 26c can be adapted to prevailing conditions, in particular to the tool 16 currently used. High variability of the vibration absorber 26 can be ensured in general with adjustable spring elements 30 and/or adjustable damping elements 66.

For specific compensation for the excitation vibrations, that it so say for effective elimination thereof, it may be necessary to also enable fine adaptation, in addition to rough adaptation of the design of the vibration absorber 26 to operating conditions to be expected, in particular to vibration frequencies of the excitation vibration that are to be expected.

Figure 7:
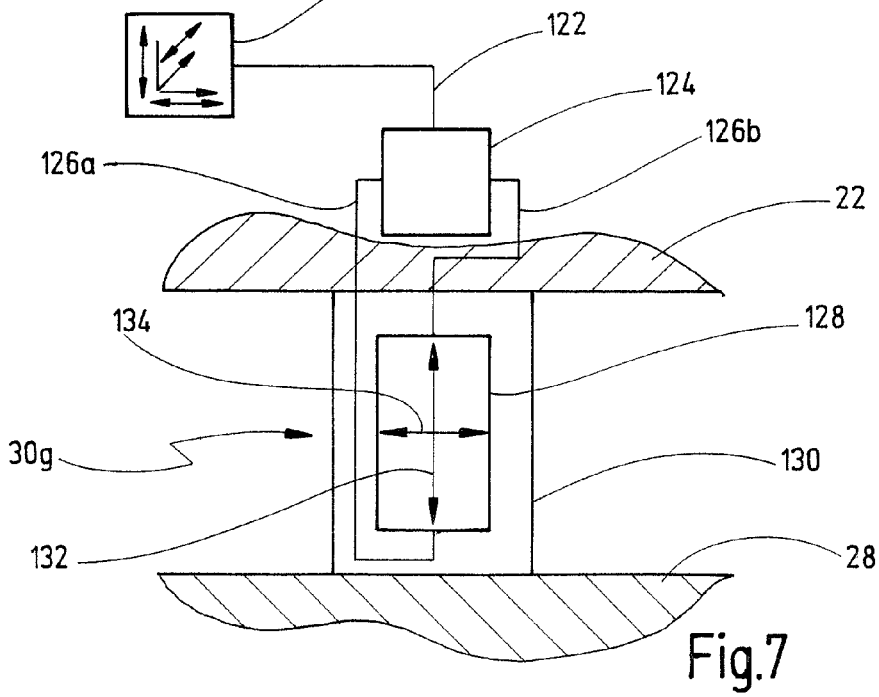
FIG. 7 shows a schematic illustration of a spring element for use in a vibration absorber according to the invention, having an adjusting element in the form of a piezo element.

FIG. 7 shows, in a simple schematic form, a configuration in which the characteristic of a spring element 30g can be adapted to prevailing operating conditions in a highly accurate manner. The spring element 30g is arranged between the gear housing 22 and the absorption mass 28, for instance according to one of the configurations in FIGS. 3 to 6. Provided on the tool 10 on the housing side is an acceleration sensor 120 which is designed for detecting actual acceleration values. The acceleration sensor 120 can be arranged, for instance, in the vicinity of a handle region of the portable tool 10 in order to detect as far as possible realistic vibration exposures acting on the user. The acceleration sensor 120 is in this case indicated as a 3D acceleration sensor which can detect vibrations in three spatial axes. It goes without saying that, if need be, the detection of instantaneous accelerations in one or two spatial axes is sufficient in order to be able to determine actual vibrations in a meaningful manner.

The acceleration sensor 120 is coupled to a control device 124 via a sensor line 122. The control device 124 is designed for acting on an actuator in the form of a piezo element 128 as a function of signals from the acceleration sensor 120 via control lines 126a, 126b. The piezo element 128 in this case can readily be understood as a stack of individual piezo elements. Piezo elements are highly dynamic actuators which experience changes in the longitudinal extent and/or the transverse extent when a voltage is applied. The resulting deformations are indicated by arrows 132, 134. The piezo element 128 is arranged on a backing material 130. The stiffness of the backing material 130 and thus of the spring element 30g overall can be influenced by applying a voltage to the piezo element 128. Thus in particular natural frequencies of the vibration absorber 26 can be adapted to prevailing operating conditions of the portable tool 10 in order to be able to absorb an excitation vibration as largely as possible.

The piezo element 128 can be applied, for instance, to a backing material 130 made of steel or plastic. Although only relatively small adjusting travel can be obtained in conventional piezo elements, even when using a plurality of elements combined to form a stack, the natural frequency, that is to say essentially the stiffness of the spring element 30g, can thus be influenced as desired, at least within a certain frequency range.

Piezo elements are highly dynamic and can be activated at a high cycle rate, and so they can react to changing operating conditions without noticeable delay.

It goes without saying that the spring element 30 can be designed as a metal spring, for instance as a leaf spring, leaf spring stack, torsion spring or tension spring or else as a compression spring. It is likewise conceivable to make all the spring elements or individual spring elements from plastic or rubber. In particular spring elements made of rubber have considerable internal friction and can consequently help to bring about a high degree of damping.

Within the scope of the invention, success has been achieved in specifying a portable tool having an oscillation drive in which the vibrations which are caused by the oscillation movement of the tool and contribute to a high degree to the vibration exposure acting on the operator can be damped by a vibration absorber in the form of a spring-mass system. Consequently, the total vibration load, in particular when using rotationally symmetrical tools, can be markedly reduced, such that, with improved ergonomics, fatigue-free work is possible. Furthermore, in this case, the arrangement of the vibration absorber with the absorption mass which at least partly encloses the tool spindle enables additional functionalities to be taken into account, such as, for instance, a suction device, although the mass centre of the absorption mass is arranged as close to the mass centre of the tool as possible.

What is claimed is:

1. A portable tool comprising:
   a housing enclosing a gear head;
   a motor received within said housing for rotatingly driving a drive shaft;
   a tool spindle for driving a tool;
   a coupling drive coupling said drive shaft with said tool spindle for rotatingly oscillatingly driving said tool spindle about a longitudinal axis thereof;
   a vibration absorber coupled with said tool spindle for compensating for vibrations, said vibration absorber comprising an absorption mass at least partially surrounding said tool spindle;
   a central spring receptacle being arranged on said absorption mass and being coupled to a leaf spring arrangement;
   wherein said leaf spring arrangement comprises two substantially symmetrical spring elements, each of said spring elements having an inner end and an outer end;
   wherein each of said inner ends engages said central spring receptacle via a coupling surface;
   wherein each of said outer ends engages via an accommodating surface on a corresponding spring receptacle accommodated on a housing side; and
   wherein each of said spring elements is shaped in a curve which is arched radially outwards and faces away from said tool spindle.

2. A portable tool comprising:
   a housing enclosing a gear head;
   a motor received within said housing for rotatingly driving a drive shaft;
   a tool spindle for driving a tool;
   a coupling drive coupling said drive shaft with said tool spindle for rotatingly oscillatingly driving said tool spindle about a longitudinal axis thereof;
   a vibration absorber coupled with said tool spindle for compensating for vibrations of said tool; and
   an absorption bearing received on a part selected from the group consisting of said tool spindle and said housing, said absorption bearing being configured for supporting said vibration absorber pivotably;
   wherein said vibration absorber comprises an absorption mass being configured substantially in a ring segment shape and enclosing said tool spindle by at least 180°;
   wherein said absorption mass has a mass centre which coincides substantially with said longitudinal axis of said tool spindle; and wherein said vibration absorber further comprises at least one spring element which is coupled to said housing and engages said absorption mass.

3. A portable tool comprising:
a housing;
a gear head;
a motor for rotatingly driving a drive shaft;
a tool spindle for driving a tool;
a coupling drive coupling said drive shaft with said tool spindle for rotatingly oscillatingly driving said tool spindle back and forth about a longitudinal axis thereof;
a vibration absorber coupled with said tool spindle for compensating for vibrations, said vibration absorber comprising an absorption mass at least partially surrounding said tool spindle.

4. The portable tool of claim 3, wherein the vibration absorber is configured for compensating for vibrations of the tool driven in an oscillatory manner, and wherein the absorption mass has a mass centre which is arranged at that end of the tool spindle which faces the tool.

5. The portable tool of claim 3, wherein said absorption mass has a mass centre which is arranged at an end of said tool spindle facing said tool.

6. The portable tool of claim 3, wherein said absorption mass has a mass centre which coincides substantially with said longitudinal axis of said tool spindle.

7. The portable tool of claim 3, wherein said absorption mass has a main inertia axis which is arranged parallel to said longitudinal axis.

8. The portable tool of claim 3, wherein said absorption mass has a main inertia axis which substantially coincides with said longitudinal axis.

9. The portable tool according claim 3, wherein said absorption mass has a first mass centre, and wherein said tool has a second mass centre arranged at a radial distance from said longitudinal axis of said tool spindle, said first mass centre being arranged offset from said longitudinal axis of said tool spindle in a direction opposite to said second mass centre.

10. The portable tool of claim 9, wherein said tool has a mass centre which is arranged substantially diametrically opposed to said mass centre of said absorption mass with respect to said longitudinal axis.

11. The portable tool of claim 3, further comprising an absorption bearing for supporting said absorption mass pivotably and being located on a part selected from the group consisting of said tool spindle and said housing.

12. The portable tool of claim 3, wherein said vibration absorber comprises at least one spring element being coupled to said housing and engaging said absorption mass.

13. The portable tool of claim 12, further comprising a plurality of spring elements having in total a directional stiffness substantially allowing an oscillation movement of said absorption mass about said longitudinal axis.

14. The portable tool of claim 12, further comprising at least one adjusting element for adjusting a spring characteristic of said spring element.

15. The portable tool of claim 14, further comprising a sensor for detecting an operating frequency of the portable tool, said sensor being coupled to said adjusting element via a control device for activating said adjusting element.

16. The portable tool of claim 3, wherein said vibration absorber further comprises at least one damping member.

17. The portable tool of claim 3, wherein said vibration absorber has a vibrating frequency which is matched to an operating frequency of said portable tool.

18. The portable tool of claim 3, further comprising an absorption bearing for supporting said vibration absorber pivotably, said absorption bearing received on a part selected from the group consisting of said tool spindle and said housing;
wherein said absorption mass is configured in a ring segment shape and comprises a centrally arranged absorption arm extending radially inwardly in a direction of said tool spindle, and further comprises two substantially symmetrical ring segment sections extending from said absorption arm and having ends provided with enlargements.

19. The portable tool of claim 18, wherein said absorption bearing is arranged between a drive-side bearing and an output-side bearing of said tool spindle;
and wherein said absorption mass has a mass centre which is axially displaced from said absorption bearing in a direction of a tool-side end of said tool spindle.

20. The portable tool of claim 3, further comprising a suction device which is mounted between said absorption mass and a tool-side end of said tool spindle, said suction device having a discharge passage which is in a plane in which said absorption mass is arranged and extends in a region in which the tool spindle is not enclosed by the absorption mass.

21. A portable tool comprising:
a housing;
a gear head;
a motor for rotatingly driving a drive shaft;
a tool spindle for driving a tool;
a coupling drive coupling said drive shaft with said tool spindle for rotatingly oscillatingly driving said tool spindle back and forth about a longitudinal axis thereof, said coupling drive comprising a drive shaft driven rotatingly by said motor, an eccentric section arranged on said drive shaft, and a coupling element coupled by a rocker to said tool spindle for driving said tool spindle;
a vibration absorber coupled with said tool spindle for compensating for vibrations, said vibration absorber comprising an absorption mass at least partially surrounding said tool spindle.

* * * * *